(12) United States Patent
Park et al.

(10) Patent No.: US 8,180,416 B2
(45) Date of Patent: May 15, 2012

(54) SLIDING-TYPE MOBILE COMMUNICATION TERMINAL

(75) Inventors: Tae-Keon Park, Suwon-si (KR); Chul-Ho Bae, Uiwang-si (KR); Tae-Ha Chang, Seoul (KR); Su-Yong Jung, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 345 days.

(21) Appl. No.: 12/042,546

(22) Filed: Mar. 5, 2008

(65) Prior Publication Data

US 2008/0158832 A1 Jul. 3, 2008

Related U.S. Application Data

(63) Continuation of application No. 10/943,330, filed on Sep. 17, 2004, now Pat. No. 7,395,102.

(30) Foreign Application Priority Data

Nov. 10, 2003 (KR) .................................. 2003-78970
Apr. 29, 2004 (KR) .................................. 2004-30023

(51) Int. Cl.
*H04M 1/00* (2006.01)
(52) U.S. Cl. ............. 455/575.4; 455/575.1; 379/428.01; 379/433.01; 379/433.12
(58) Field of Classification Search ............... 455/575.1, 455/575.4, 575.8; 379/428.01, 433.01, 433.11, 379/433.12
See application file for complete search history.

(56) References Cited

U.S. PATENT DOCUMENTS

| | | | |
|---|---|---|---|
| 6,370,362 B1 * | 4/2002 | Hansen et al. ............... | 455/90.1 |
| 6,785,565 B2 * | 8/2004 | Gventer ..................... | 455/575.4 |
| 6,822,871 B2 * | 11/2004 | Lee et al. ....................... | 361/727 |
| 6,961,593 B1 * | 11/2005 | Lonka et al. ................... | 455/573 |
| 7,162,283 B2 * | 1/2007 | Bae et al. ..................... | 455/575.4 |
| 2002/0006813 A1 | 1/2002 | Lubowicki et al. | |
| 2003/0064688 A1 * | 4/2003 | Mizuta et al. ................... | 455/90 |
| 2003/0119543 A1 * | 6/2003 | Kfoury et al. ................. | 455/550 |
| 2003/0119544 A1 | 6/2003 | Gventer | |

FOREIGN PATENT DOCUMENTS

| | | | |
|---|---|---|---|
| CN | 2681471 | | 2/2005 |
| DE | 43 07 164 | | 3/1993 |
| EP | 1 422 911 | | 5/2004 |
| EP | 1 501 260 | | 1/2005 |
| KR | 200308165 | * | 3/2003 |

OTHER PUBLICATIONS

European Search Report In Counterpart Appln. No. 04025590.3, Feb. 25, 2005.

* cited by examiner

*Primary Examiner* — Raymond Dean
(74) *Attorney, Agent, or Firm* — The Farrell Law Firm P.C.

(57) ABSTRACT

A sliding-type mobile communication terminal having a first housing and a second housing opened or closed by means of a sliding movement in a longitudinal direction of the first housing, The terminal includes a spring module adapted to provide a sliding force, along the longitudinal direction, for closing of the second housing within a predetermined range of distance, and for providing the sliding force in an opposite direction for opening of the second housing beyond the predetermined range of distance. The spring module includes link bars rotatably coupled in one end onto the first housing, coil springs supported by one end of the link bar and coupled to enclose the link bar, and a slider slidably coupled to the link bar to be acted upon by an elastic force from the coil spring. The coil springs implement a semi-automatic sliding opening/closure of the second housing.

9 Claims, 22 Drawing Sheets

SLIDING-TYPE MOBILE COMMUNICATION TERMINAL

CLAIM OF PRIORITY

This application is a continuation application of application Ser. No. 10/943,330, filed with the U.S. Patent and Trademark Office Sep. 17,2004 now U.S. Pat No. 7,395,102, and this application makes reference to, incorporates the same by reference herein, and claims all benefits accruing under 35 U.S.C. §119 from applications entitled "A Sliding-type Portable Wireless Communication Terminal "earlier filed in the Korean Industrial Property Office in Nov. 10, 2003 and Apr. 29, 2004 and thereby duly assigned Ser. No. 2003-78970 and 2004-30023, respectively.

BACKGROUND OF THE INVENTION

1. Field of the Invention

The present invention relates generally to a mobile communication terminal, and in particular, to a sliding-type or slidable mobile communication terminal with two or more housings configured so that the one housing is allowed to slide in a longitudinal direction of the other housing to open or close a keypad section on the first housing.

2. Description of the Related Art

A mobile telephone terminal is a portable mobile station that provides wireless communication services to its subscriber while wirelessly communicating with its base station. Rapid development in the field of information and telecommunication business has made it possible for mobile users to use a variety of functions and types of mobile phones available on the market. These mobile telephone terminals are generally classified into three or more types of terminals, such as, e.g., a bar-type terminal, a flip-type terminal with a flip cover, and a foldable terminal with a folder adapted to be open and closed about a main body at a given angle.

The bar-type terminal is generally formed with a single body housing configured so that various data input/output means and a receiver and transmitter set are arranged on the housing, and a keypad assembly utilized as a data input/output means is fully exposed. Thus, a bar-type terminal is often apt to operate in error due to careless manipulation by its user, and its design requires a relatively long distance between the receiver set and the transmitter set which may lead to serious limitations in making the terminal smaller.

The flip-type terminal generally consists of a main body, a flip member and a hinge module for coupling the main body and the flip member, in which the main body is provided with a data input/output means, that is, a keypad, and a receiver and transmitter set. This type of terminal can prevent any undesired operation error or malfunction since the flip member is adapted to fully cover the keypad when the flip member is closed, but the design of this type of terminal also requires a relatively long distance between the receiver set and the transmitter set, which results in serious limitations in making smaller terminal.

The folder-type or foldable terminal generally consists of a main body, a folder and a hinge module for coupling the main body and the folder, so that rotation of the folder allows opening or closure of the folder with respect to the main body. The main body is provided with a data input/output means, that is, a keypad and a receiver set. Thus, when the folder is in the closed state on the main body in a standby mode, the terminal can prevent any undesired operation error or malfunction since the folder is adapted to fully cover the keypad. However, in a telephone mode, since the folder is usually rotated away from the main body of the mobile phone to ensure enough distance between the receiver and the transmitter of the phone, the design of this type of terminal may be made much smaller. As such, mobile users recently have preferred foldable terminals to any other type of mobile communication terminals.

When using flip-type or foldable terminals, the hinge module for rotatably coupling the flip member or the folder with the main body operates in such a manner that when the flip or folder of the mobile terminal is opened to rotate up to a specified threshold angle about the main body, a continuous acting force is generated by the hinge module and is applied in the direction of opening without application of additional external force by a user, while when the flip or folder of the mobile terminal is rotated during closing below a specified threshold angle about the main body, a continuous acting force is generated by the hinge module and is applied in the direction of closure without application of more force by the user.

In the meantime, as more diverse design concepts are introduced in the design of mobile communication terminals, a sliding type of mobile terminal has recently been in wide use and consists of two housings in which one housing is slidably opened or closed with respect to the other housing. However, these sliding type mobile terminals have not yet been proposed with a variety of different designs in structure, and for this reason, its users may feel some inconvenience in that they have to manually slide one housing with respect to the other housing to open or close it.

SUMMARY OF THE INVENTION

It is, therefore, an object of the present invention to provide a sliding type mobile communication terminal having a plurality of housings adapted to allow a user to control the opening and closure operation with more ease and convenience.

To achieve the above and other objects of the present invention, there is provided a sliding type mobile communication terminal having a first housing and a second housing adapted to allow the first housing to be opened or closed using a sliding movement on the first housing in a longitudinal direction of the first housing. The terminal includes a spring module adapted for providing a sliding force, along the longitudinal direction of the first housing, in a first direction for allowing closure of the second housing within a predetermined range of distance, and for providing the sliding force in a second direction for allowing opening of the second housing beyond the predetermined range of distance, the spring module having at least one link bar rotatably coupled at one end onto the first housing; at least one coil spring supported by one end of the link bar and coupled to enclose the link bar; and at least one slider slidably coupled with respect to the link bar so as to be acted upon by an elastic force from the coil spring, and also slidably coupled onto the second housing.

According to another aspect of the present invention, there is provided a sliding type mobile communication terminal having a first housing and a second housing adapted to allow the first housing to be opened or closed by means of a sliding movement on the first housing in a longitudinal direction of the first housing. The terminal includes a spring module configured for providing a sliding force, along the longitudinal direction of the first housing, in a first direction for allowing closure of the second housing within a predetermined range of distance, and for providing the sliding force in a second direction for allowing opening of the second housing beyond the predetermined range of distance, the spring module having at least one link bar, one end of the link bar being rotatably coupled with one side of a front surface of the first housing, and the other end of the link bar being rotatably coupled with the second housing, so that the link bar is allowed to slide in a direction perpendicular to the direction of movement in the second housing; and at least one coil spring supported at one end by the second housing and at an opposite end by the other end of the link bar, for providing an elastic force in a direction in which the other end of the link bar approaches the one side of the front surface of the first housing.

According to still another aspect of the present invention, there is provided a sliding type mobile communication terminal having a first housing and a second housing, the second housing adapted to allow the first housing to be opened or closed by means of a sliding movement on the first housing in a longitudinal direction of the first housing. The terminal includes a spring module having a sliding guide fixedly coupled to one side surface of the first housing, a slider fixedly coupled to one side surface of the second housing to allow a sliding movement on the sliding guide, at least one pair of one guide rods each fixed to one end of both sides of the slider, for slidably coupling with the sliding guide in the longitudinal direction, and an elastic means interposed between the sliding guide and the slider for providing an elastic force; and the elastic means configured to provide the sliding force, along the longitudinal direction of the first housing, in a first direction to allow closing of the first housing within a predetermined range of distance, and to provide the sliding force in a second direction to allow opening of the first housing beyond the predetermined range of distance.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Figure 1:
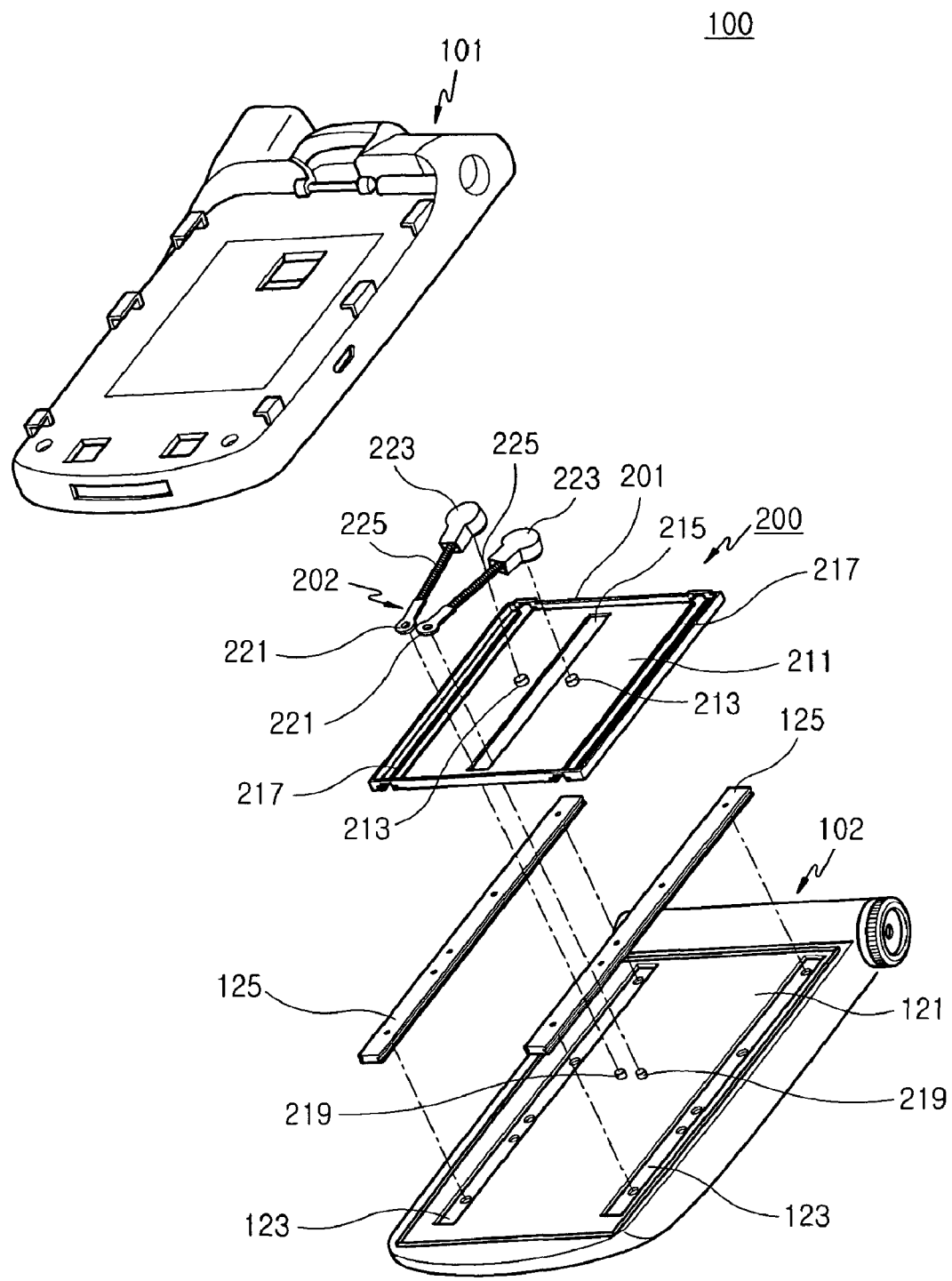
FIG. 1 is an exploded perspective view showing a sliding type mobile terminal according to one embodiment of the present invention.

The present invention will be described herein below with reference to the accompanying drawings, which are provided for purposes of illustration and do not limit the present invention to the depiction in the drawings. In the following description, well-known functions or constructions may not be described in detail to avoid obscuring the invention with unnecessary detail. Throughout the application like reference numerals are intended to represent like components.

Referring now to FIG. 1, there is shown a sliding type of mobile terminal 100 according to a first embodiment of the present invention. The sliding type of mobile terminal 100 includes a first housing 101 and a second housing 102, the second housing being coupled with the first housing in a face to face relation with each other. The second housing 102 is provided with guide rails 125 and a spring module 200 for movably coupling the second housing 102 with the first housing in the longitudinal direction of the first housing 101.

The first housing 101 is provided on its front surface with a keypad assembly 111 (shown in FIG. 8) and a transmitter 113 (shown in FIG. 8) with a microphone set. A sliding operation of the second housing 102 on the first housing 101 in its longitudinal direction allows a section with the keypad and transmitter to be open or closed.

The second housing 102 is coupled with the first housing 101 in a sliding relation in its longitudinal direction, and is equipped with a receiver 117 (shown in FIG. 8) with a speaker, a display unit 115, and a multiplicity of function keys 119. The display unit is made from various display elements such as liquid crystal display (LCD), thin film transistor (TFT), etc. On the back side 121 of the second housing 102 are installed a pair of guide rails 125 for smooth sliding movement of the first housing. Guide rails 125, which may be formed of an extended H-beam with side recesses, is fixed to a linkage groove formed in the longitudinal direction on the back side of the second housing 102.

Figure 2:
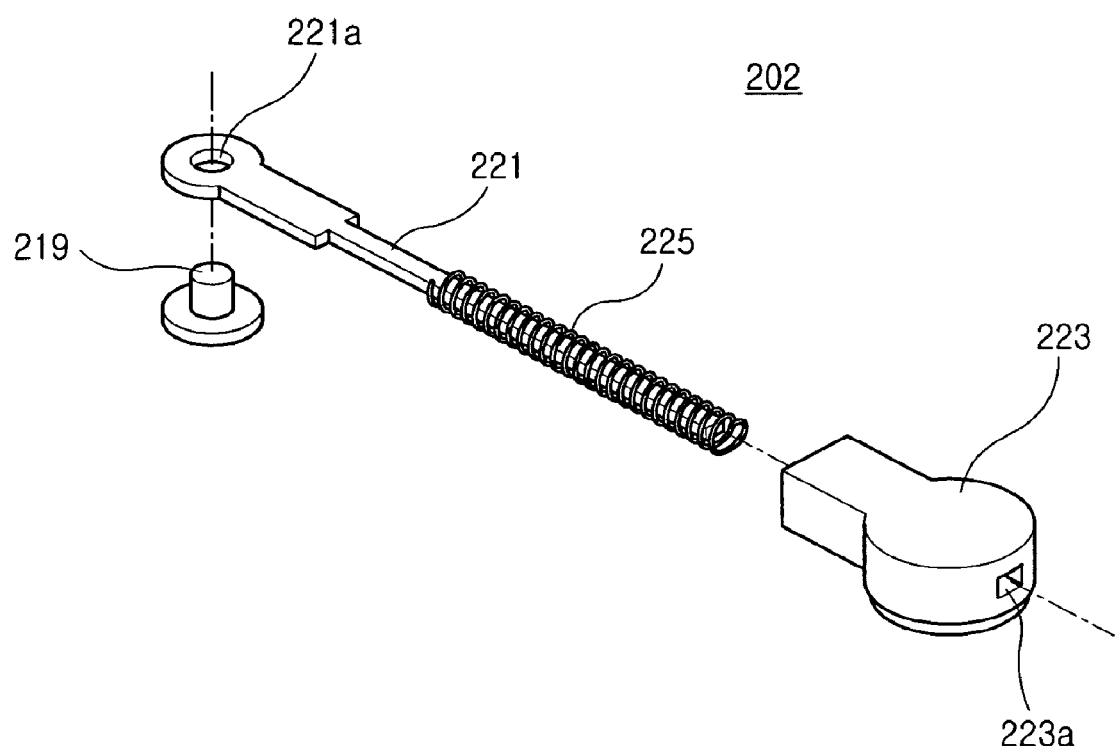
FIG. 2 is a perspective view showing in sections components of a spring module utilized in a sliding type mobile terminal as shown in FIG. 1.

The spring module 200 is coupled onto the first housing 101 so as to provide an elastic force for movement of the second housing 102 in either direction for opening or closing of the keypad and transmitter section on the mobile terminal. Referring again to FIGS. 1 and 2, the spring module 200 is provided with a module housing 201 and a link assembly 202 equipped on the module housing 201, and the link assembly 202 is further provided with a link bar 221, sliders 223 and a coil spring 225. The module housing 201 is coupled to the front surface of the first housing 101 and is provided with a pair of first protrusions 213 on its inner surface 211, so that the sliders 223 are rotatably coupled about the first protrusions 213. Between the first protrusions 213 is an opening 215 extending in the longitudinal direction. The pair of first protrusions 213 are preferably arranged in the middle position of the opening 215 or in vicinity of the center position of the opening, symmetrical to the opening center. On the outer side of the module housing 201 is arranged a guide recess 217 corresponding to the guide rail 125. The longitudinal movement of the guide rail 125 within the guide recess 217 allows the second housing 102 to slide on the first housing 101 in its longitudinal direction.

One end of the link bar 221 is rotatably coupled to the back side of the second housing 102 through the opening 215. For such rotatable coupling of the link bar 221, a pair of second protrusions 219 may be arranged on the back side of the second housing 102, and a hole 221a for rotatable coupling with the second protrusion 219 may be formed in one end of the link bar 221. The second protrusions 219 may be preferably arranged symmetrically with respect to each other, and project to the inside of the module housing 201 through the opening 215 thereof. As such, as the second housing 102 slidingly moves in the longitudinal direction of the first housing 101, the second protrusion 219 is allowed to move along the longitudinal direction of the opening 215.

The slider 223, provided with a hole 223a through which the link bar 221 passes, is slidably coupled with respect to the link bar 221 to allow for rotatable coupling on the first protrusion 213. The coil spring 225 encloses the link bar 221 and its both ends are supported by one of the link bar 221 and the slider 223. The coil spring 225 will provide an elastic force upon the slider 223 as the slider 223 becomes more distant from one end of the link bar 221.

Figure 3:
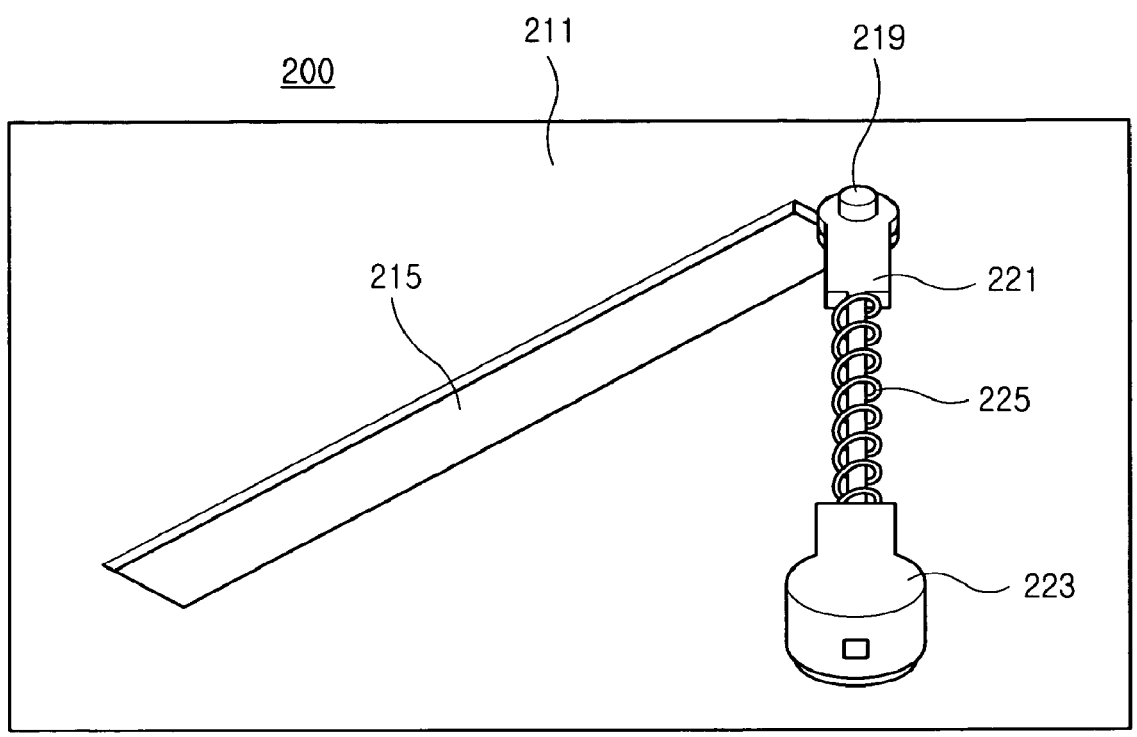
FIGS. 3 to 5 are schematic perspective diagrams illustrating the operation of the spring module of the sliding type mobile terminal shown in FIG. 1.
Figure 4:
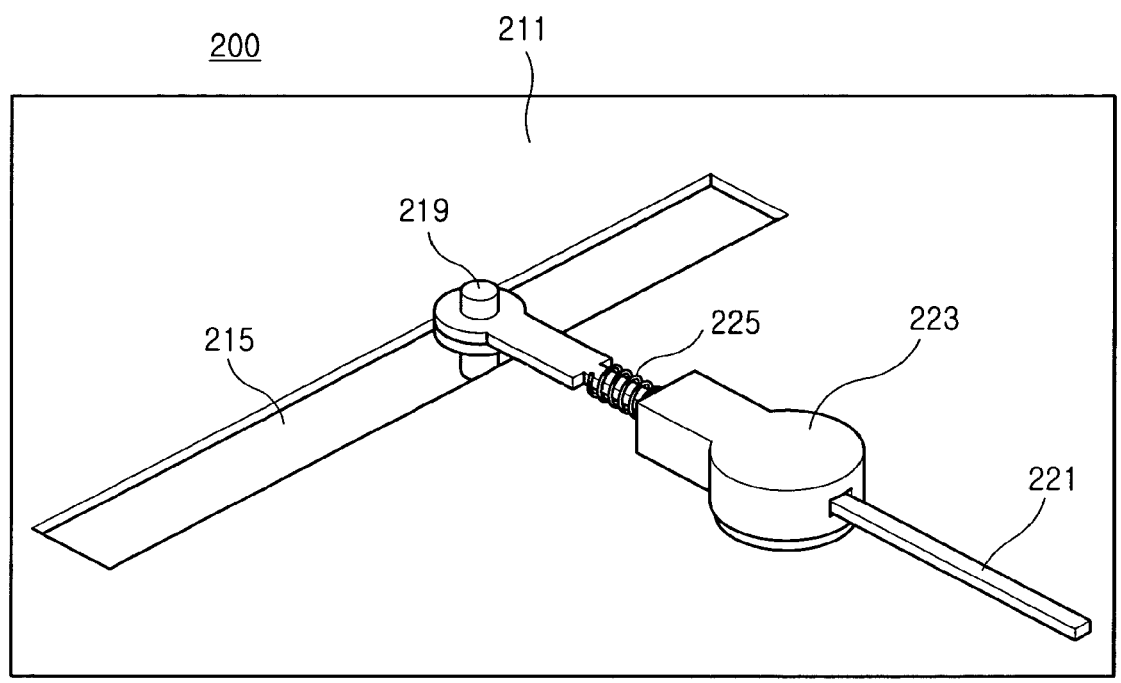
Figure 5:
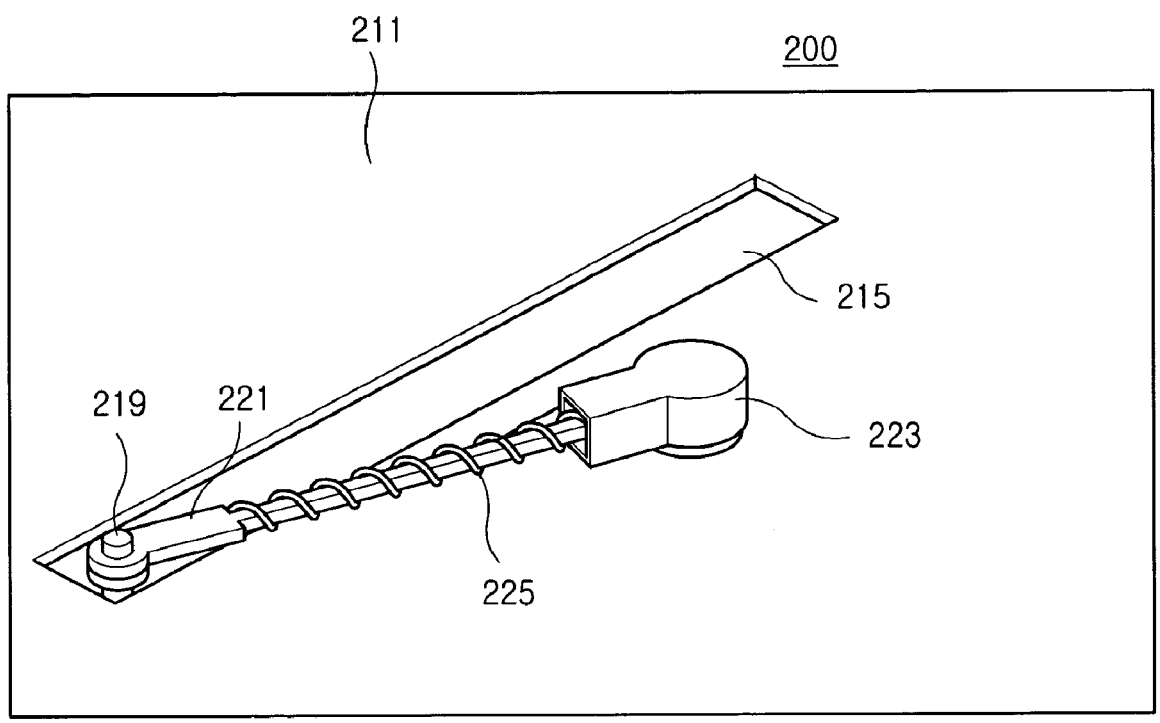

Referring how to FIGS. 3 to 5, the operation of the spring module of the sliding type mobile terminal as shown in FIG. 1 will be described. As the slider 223 is slidably coupled with the link bar 221 and is also rotatably coupled to the first protrusions 213, and one end of the link bar 221 is rotatably coupled with the second protrusion 219, the coil spring 225 provides elasticity to the slider 223 as the slider 223 becomes more distant from one end of the link bar 221. At this time, the position of the slider 223 coupled onto the first protrusion 213 is kept fixed as in FIG. 3. Hence, the elasticity in the coil spring 225 acts in the direction that the second protrusions 219 are positioned on both ends of the opening 215.

As a certain level of external force is applied from a user while the second protrusion 219 is positioned at one end of the opening 215, to the second protrusion 219 moves along the opening 215 to approach the first protrusion 213 as shown in FIG. 4. At this time, the elastic force accumulated in the coil spring 225 increases gradually. If the second protrusion 219 has passed the point nearest to the first protrusion 213, the second protrusion 219 moves toward the other end of the opening 215 due to the elastic force of the coil spring 225 without further external force being applied from the user. That is to say, it is appreciated that once a user allows the second housing 102 of the mobile terminal 100 to slide a given length, the second housing 102 fully opens due to the elastic force of the coil spring 225, to the position shown in FIG. 5. Further, when the second protrusion 219 is positioned at either end of the opening 215, it is possible to stably maintain the state in which the second housing 102 is fully opened or closed with respect to the first housing 101. This relation will be understood with ease with reference to FIGS. 6-8 and the following description.

Figure 6:
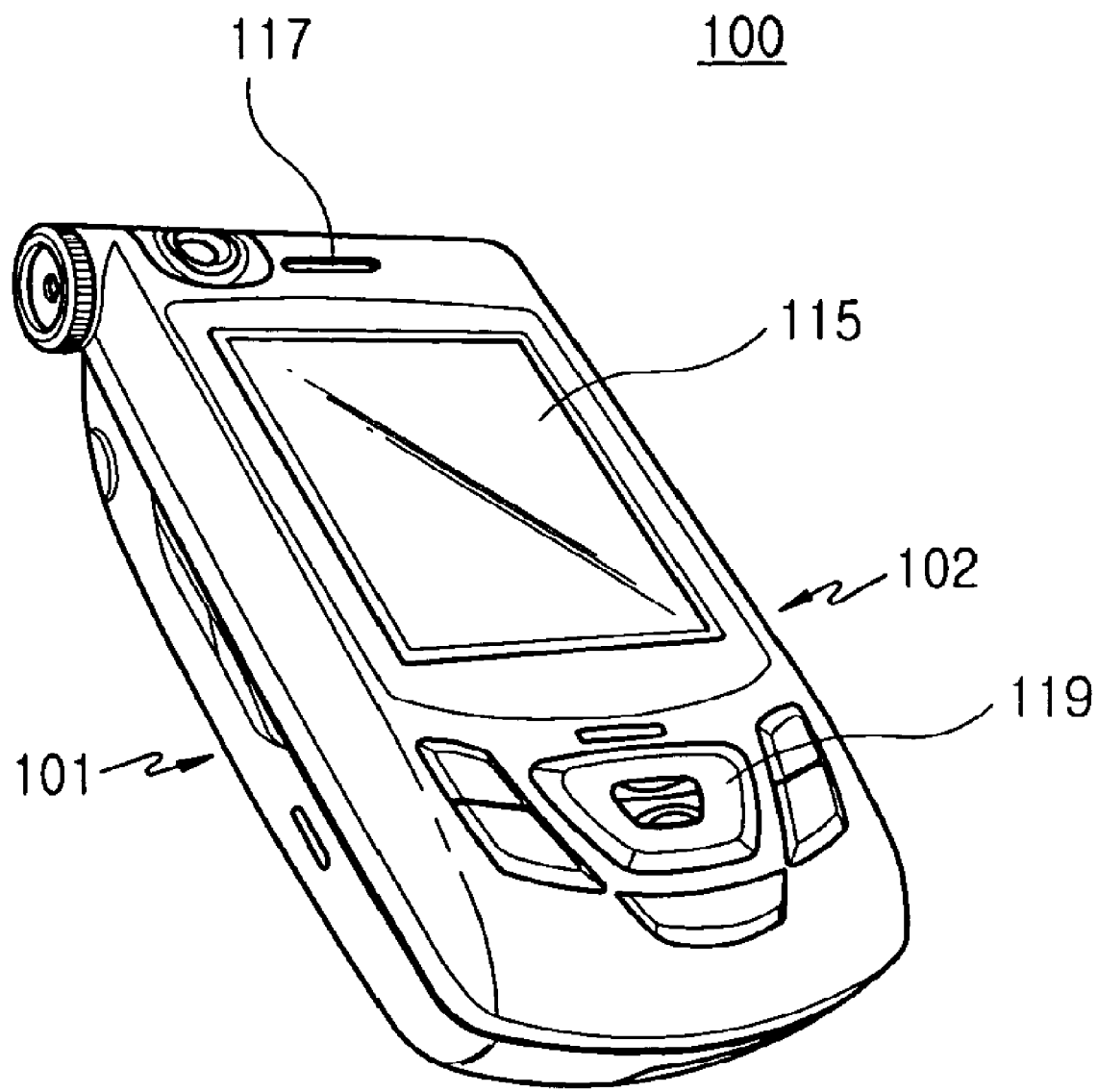
FIGS. 6 to 8 are perspective views illustrating the opening and closure operations of the sliding-type mobile terminal shown in FIG. 1.
Figure 7:
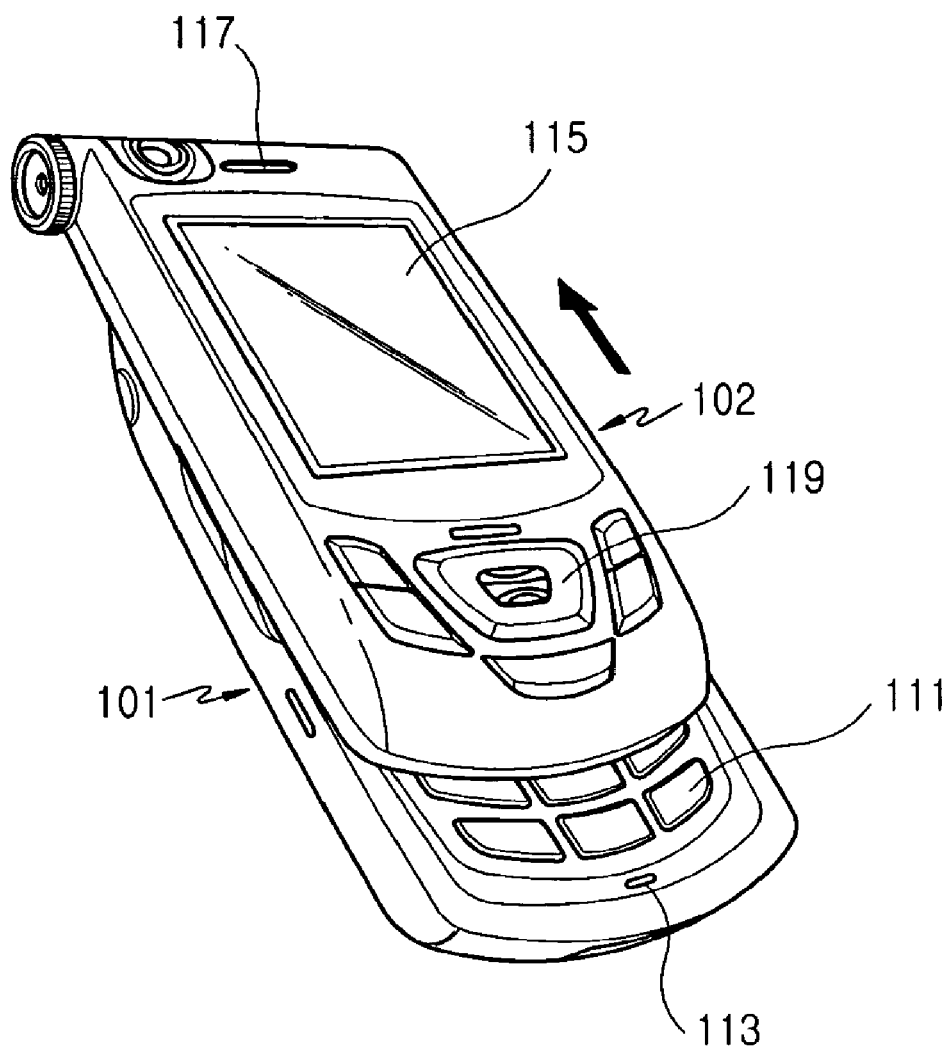
Figure 8:
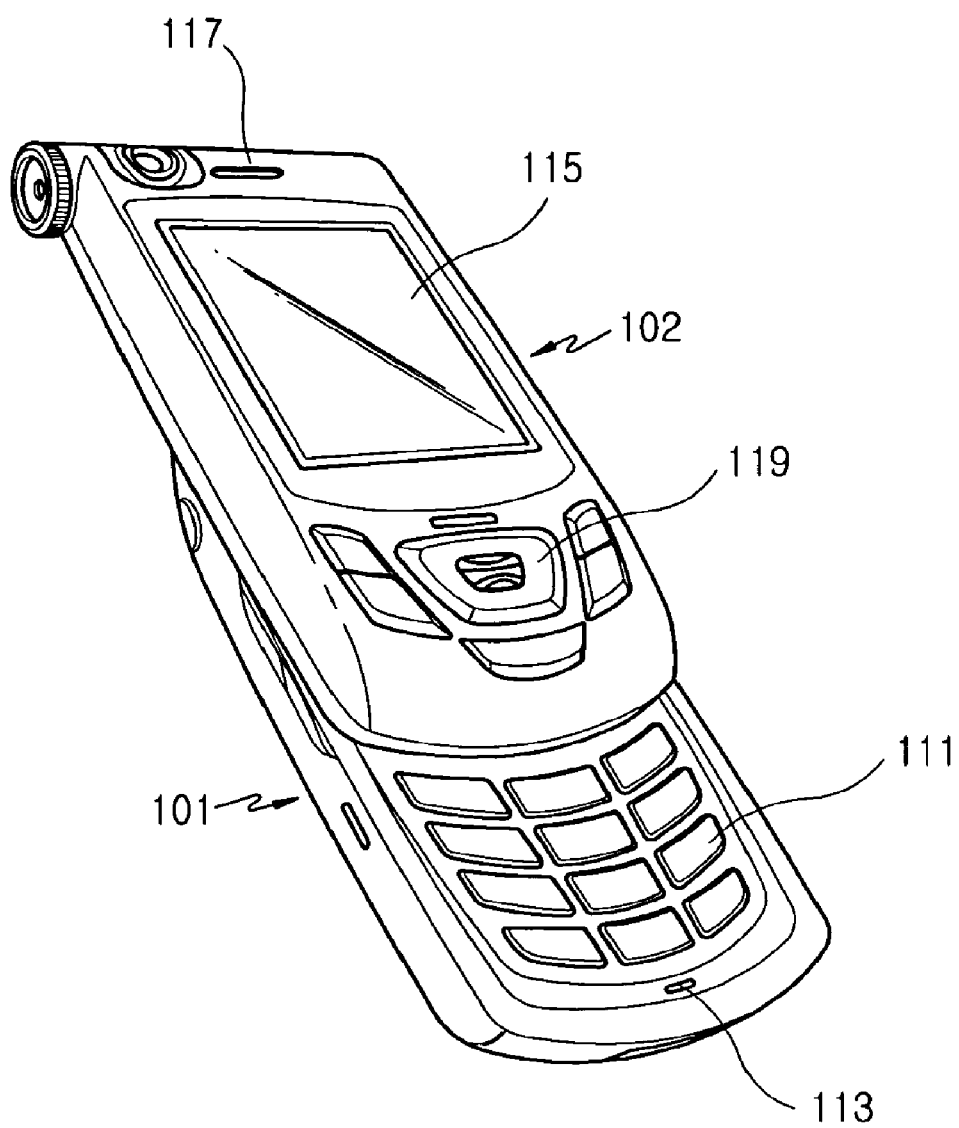

FIG. 6 shows a perspective view of the sliding type mobile terminal 100 as shown in FIG. 1 in a fully closed position FIG. 7 shows a perspective view of the sliding type mobile terminal 100 with the second housing 102 partially opened to allow the keypad 111 and the transmitter 113 of the first housing 101 to be partially exposed. FIG. 8 shows a perspective view of the sliding type mobile terminal 100 in the fully opened position.

As shown in FIG. 6, when the mobile terminal 100 is fully closed, the second protrusions 219 are positioned in one end of the opening 215 in the module housing 201 by means of the elastic force by the coil spring 225, as shown in FIG. 3.

As shown in FIG. 7, as the user slides the second housing 102 on the first housing 101 to open the terminal gradually, the second protrusion 219 approaches the first protrusion 213 so that the elastic force accumulated in the coil spring 225 increases gradually, as shown in FIG. 4. Once the second protrusion 219 passes the closest position to the first protrusion 213, the second protrusion 219 becomes further spaced apart from the first protrusion 213 due to the elastic force accumulated in the coil spring 225 until it is positioned in the other end of the opening 215, as shown in FIG. 5. As such, the second housing 102 allows the first housing 101 to fully open utilizing the elastic force of the coil spring 225.

In order to close the first housing 101 again, the user slides the second housing 102 onto the first housing 101. At this time, if the user applies force to the second housing 102 to slide the second housing only to the point where the second protrusion 219 passes the closest position to the first protrusion 213, the second housing 102 will then move itself to the position where the first housing 101 is fully closed, by means of the elastic force of the coil spring 225.

In the meantime, there remains a certain level of elastic force in the coil spring 225 when the second housing 102 and the first housing 101 are fully closed. In this state the elastic force of the coil spring 225 forces the second protrusions 219 to maintain close contact with one end of the opening 215. This functions to keep the closed state of the first housing 101 with respect to the second housing 102. Similarly, there remains a certain level of elastic force in the coil spring 225 when the second housing 102 and the first housing 101 are fully opened. In this state the elastic force of the coil spring 225 forces the second protrusions 219 to maintain close contact with the other end of the opening 215. This functions to keep the opened state of the first housing 101 with respect to the second housing 102.

Figure 9:
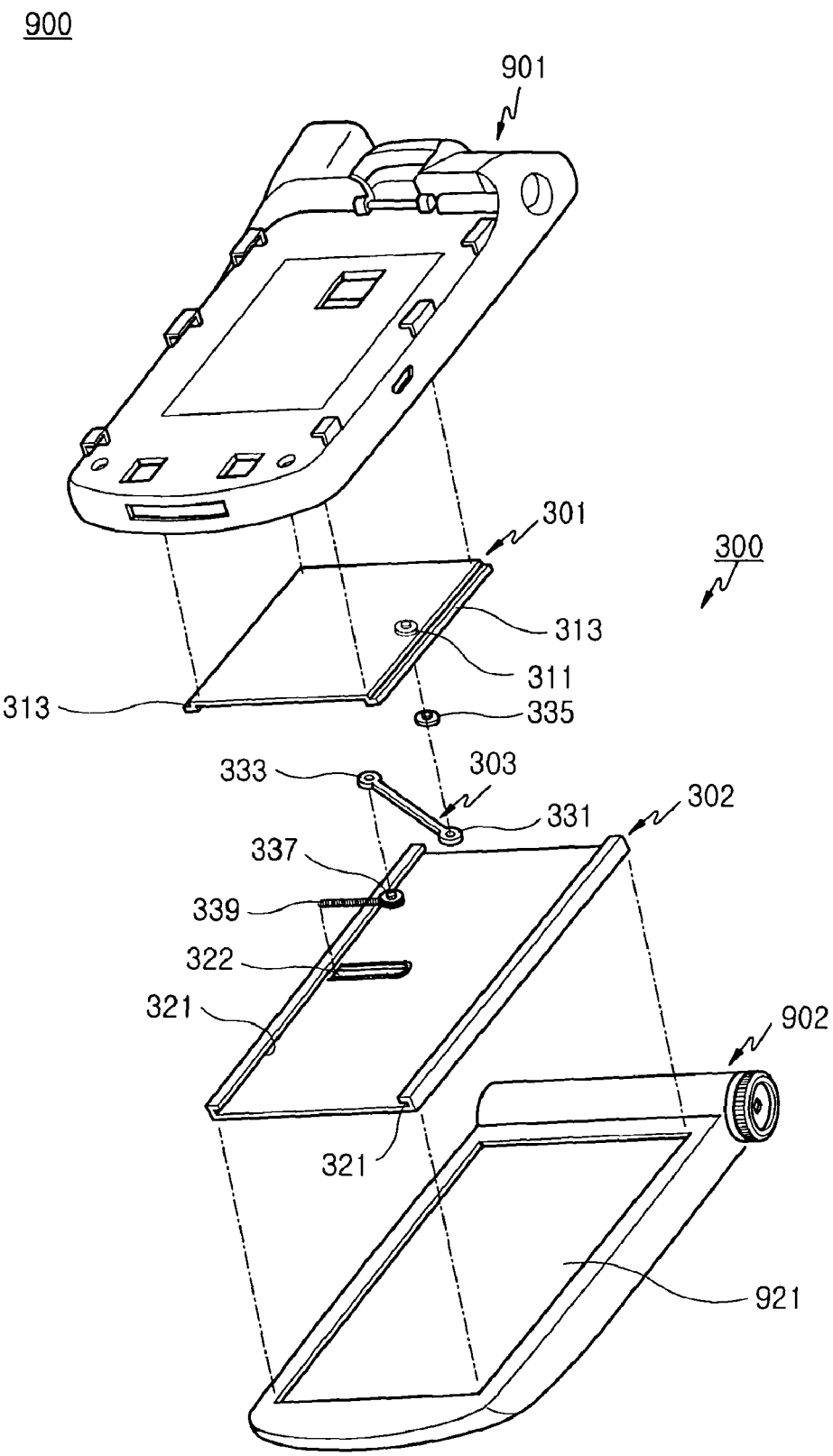
FIG. 9 is an exploded perspective view showing a sliding type mobile terminal according to a second embodiment of the present invention.

Referring now to FIG. 9, sliding type mobile communication terminal 900 according to a second embodiment of the present invention includes a first housing 901 and a second housing 902, the second housing 902 having a sitting groove 921 having a given depth on its back side and being coupled to face the first housing 901. A spring module 300 for movably coupling the second housing 902 in the longitudinal direction of the first housing 901 is provided. The spring module 300 provides an elastic force to allow the second housing 902 to be closed within a specified range of distance along the longitudinal direction of the first housing 901 and also provides an elastic force to allow the second housing 902 to be opened beyond the specified range of distance along the longitudinal direction of the first housing 901.

The spring module 300 includes a first sliding base 301, a second sliding base 302, a link bar 303 and a coil spring 339. The first sliding base 301 is preferably in the form of a plate coupled to a front surface of the first housing 901 and is provided along both side edges with guide ribs 313, each extending in the longitudinal direction of the first housing 901. On a front surface of the first sliding base 301 is disposed a rotating hole 311 to which the link bar 303 is coupled. The first sliding base 301 may be configured in the structure incorporated into the first housing 901, in which case the guide rib 313 would project by a given height on the front surface of the first housing 901.

In contrast to the first sliding base 301, the second sliding base 302 is preferably in the form of a plate coupled to a back surface of the Second housing 902 and is configured to face the first sliding base 301. Both side ends of the second sliding base 302 form edges facing each other, and are respectively provided with a guide groove 321 to match the guide rib 313. The guide groove 321 extends in the longitudinal direction of the first housing 901 for slideable engagement with the guide rib 313. As such, the second sliding base 302 is slidably coupled with the first sliding base 301, thereby facing each other. Further, the second sliding base 302 is provided with a sliding groove 322 extending in a direction perpendicular to the guide groove 321. The sliding groove 322 may be formed to pass through the front and back sides of the second sliding base 302 or in the form of recess having a given depth. The second sliding base 302 may be formed in the structure incorporated into the back side of the second housing 902.

The elastic force in the coil spring 339 acts upon the second sliding base 302 through the link bar 303 to slide the second housing 902 in the longitudinal direction of the first housing 901. That is to say, the second sliding base 302 moves in the longitudinal direction on the first sliding base 301 with help of the elastic force in the coil spring 339.

One end of the link bar 303 is rotatably coupled to the rotating hole 311 in the first sliding base 301, and its other end is rotatably and slidably coupled to the sliding groove 322 in the second sliding base 302. For rotatably coupling with respect to the rotating hole 311, a rotating pin 335 is provided in one end 331 of the link bar 303. Alternatively, the rotating pin 335 may be incorporated into the end of the link bar 303 for rotatably coupling with respect to the rotating hole 311.

For permitting slidable and rotatable coupling with respect to the sliding groove 322, a slider 337 is provided in the other end 333 of the link bar 303. The slider 337 is configured to slidably move within the sliding groove 322, so that its one end can be rotatably coupled with the other end 333 of the link bar 303. Alternatively, the slider 337 can be constructed in cylindrical form, so that the slider 337 could rotate in itself inside the sliding groove 322. In addition, the slider 337 may be incorporated into the other end 333 of the link bar 303.

The coil spring 339 is equipped within the sliding groove 322, one end of which coil spring is supported by one end of the sliding groove 322 and other end of which coil spring is supported by the slider 337, so that the slider 337 moves in the direction approaching one side edge of the second sliding base 302 within the sliding groove 322, thereby providing the elastic force. That is to say, the other end 333 of the link bar 303 is subject to the elastic force for movement in the direction approaching one end of the first sliding base 301.

Figure 10:
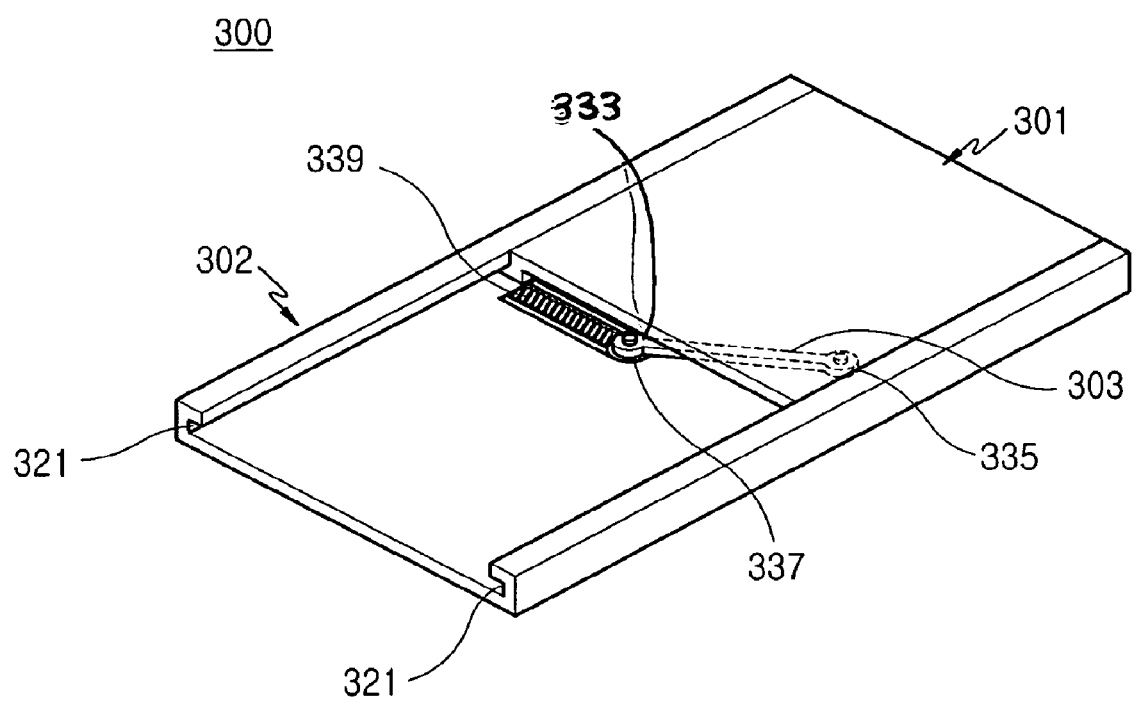
FIGS. 10 to 12 are schematic perspective diagrams illustrating the operation of the spring module of the sliding-type mobile terminal shown in FIG. 9.
Figure 11:
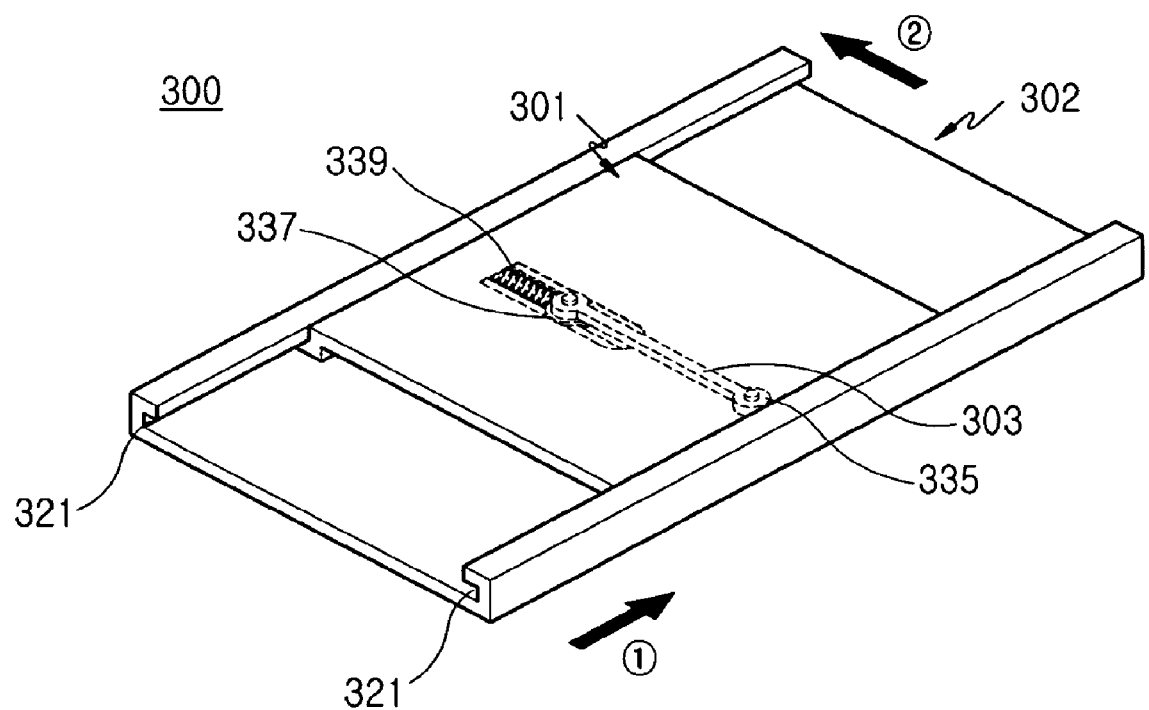
Figure 12:
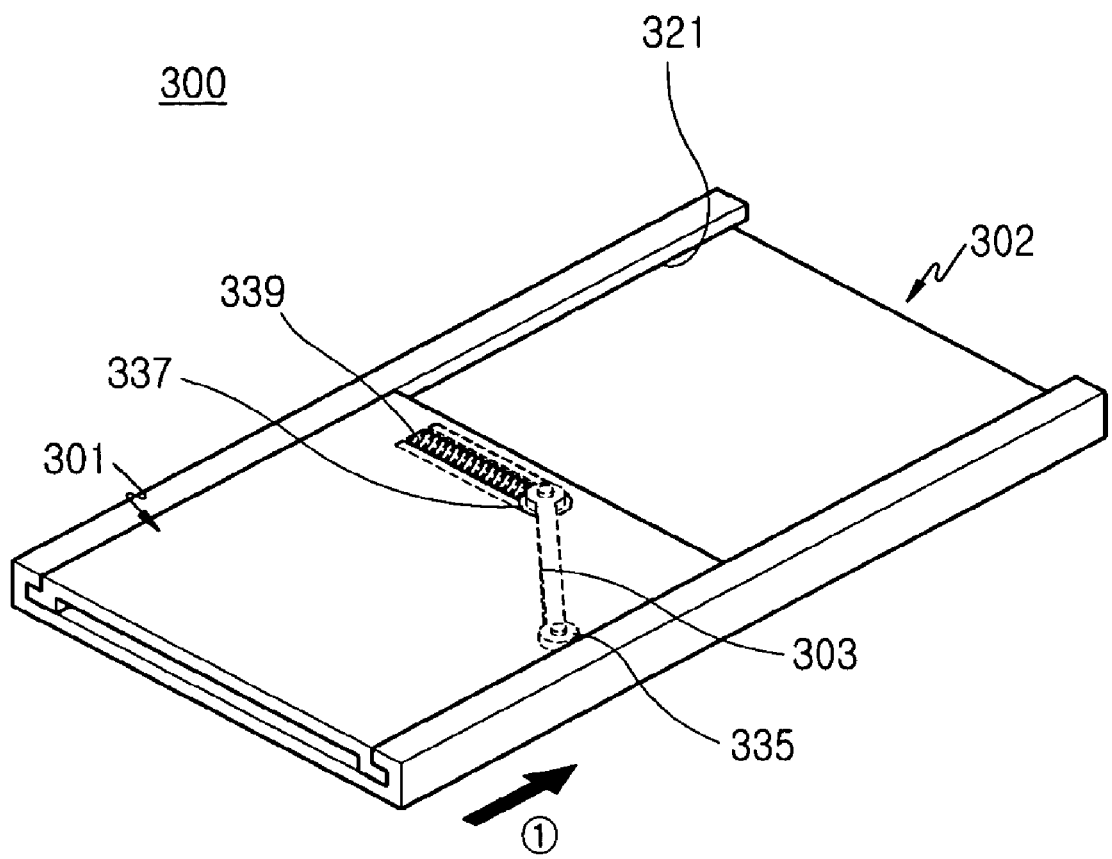

Referring now to FIGS. 10 to 12, description will be made of the operation of the spring module 300 of the sliding type mobile terminal 900 as shown in FIG. 9. In particular, FIG. 10 illustrates the spring module 300 in the case in which the second housing 902 and the first housing 901 are closed. In this state, the second sliding base 302 is positioned underneath the first sliding base 301. At this point, the elasticity accumulated in the coil spring 339 is at a minimum and the other end 333 of the link bar 303 is placed in the furthest position with respect to the edge of the second sliding base 302.

Referring to FIG. 11, once the user applies force to move the second housing 902 upwardly in the longitudinal direction of the first housing 901, the second sliding base 302 moves along the direction indicated by arrow 1 and the other end 333 of the link bar 303 moves along the direction indicated by arrow 2, so that it moves closer to the edge the second sliding base 302 to thereby accumulate the elasticity into the coil spring 339. In the meantime, the elastic force accumulated in the coil spring 339 when the sliding groove 322 is straight in line with the link bar 303, is the maximum level. If the user allows the second housing 902 to move further upwardly over the first housing 901, then the elastic force accumulated in the coil spring 339 acts to move the other end 333 of the link bar 303 away from the edge of the second sliding base 302 again, as seen in FIG. 12. That is to say, without further application on force from the user, the elastic force applied by in the coil spring 339 allows the second housing 902 to move in the upward direction of the first housing 901. FIG. 12 shows the second housing 902 fully moved upwardly with respect to the first housing 901.

Thus, depending on the position of the sliding groove 322 and the link bar 303, the spring module 300 provides the elastic force in a direction in which the second housing 902 either closes or opens with respect to the first housing 901. If the user allows the second housing 902 to move beyond the position where the link bar 303 is placed in line with the sliding groove 322, then the second housing 902 is allowed to move due to the elastic force in the spring module 300.

Figure 13:
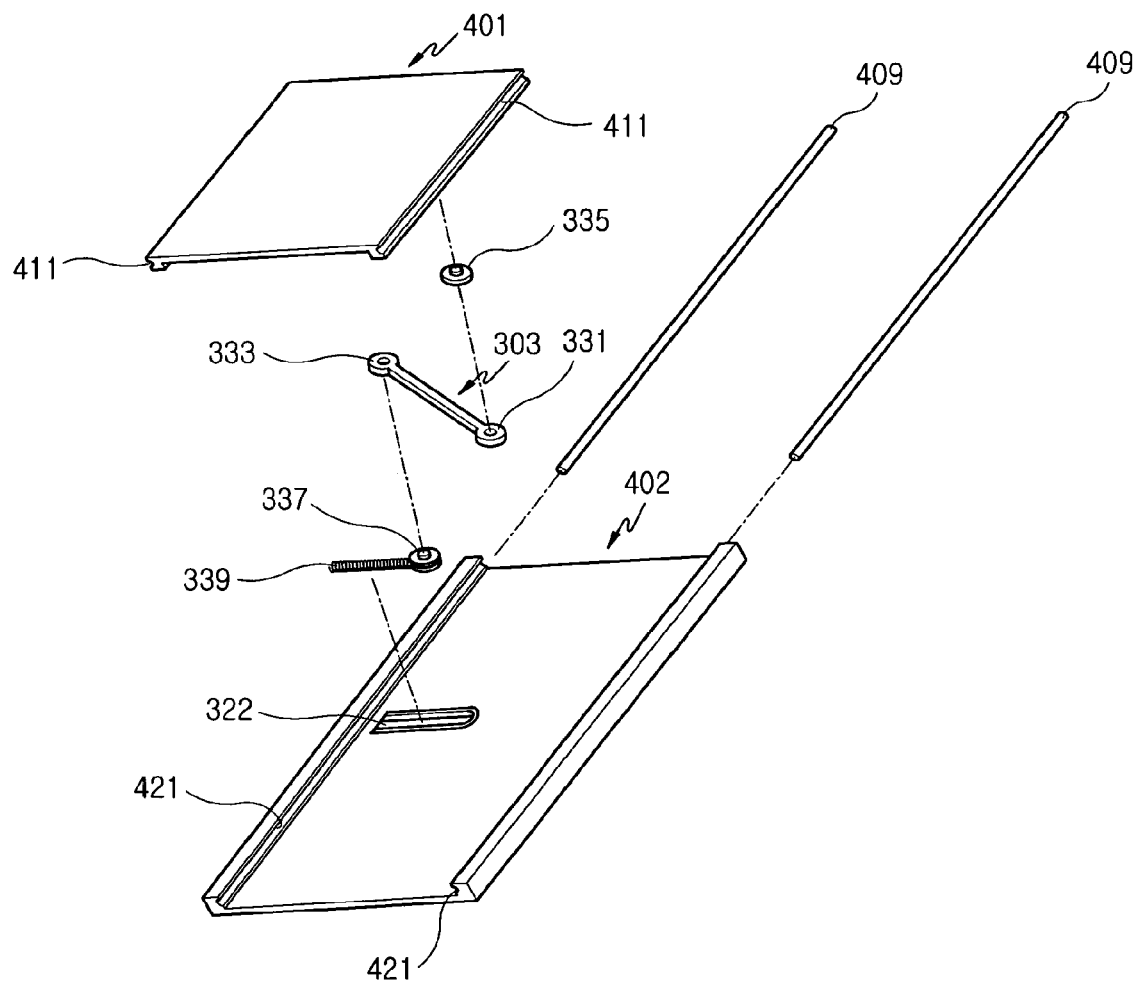
FIG. 13 is an exploded perspective view showing a spring module of a sliding type mobile terminal according to a third embodiment of the present invention.

Referring now to FIG. 13, there is shown a spring module 400 of the sliding type mobile terminal according to a third embodiment of the present invention. In this example of the spring module 400 as shown in FIG. 13, like reference numerals are intended to represent like components as in the preceding embodiments, e.g. the spring module 300, but its detailed description will be omitted. As illustrated in the drawing, the spring module 400 of the sliding type mobile terminal according to the third embodiment of the present invention includes a first sliding base 401, a second sliding base 402, a link bar 303 and a coil spring 339.

The first sliding base 401 is in the form of a plate having in each side end a first guide groove 411 extending in the longitudinal direction. The second sliding base 402 is coupled with the first sliding base 401 in face-to-face relation, and second guide grooves 421 are arranged in its inner sides to face the first guide grooves 411.

Onto the respective second guide grooves 421 are fixed a guide rail 409 with annular profile as a rod. With the guide rails 409 fixed to the second guide grooves 421, the first sliding groove 411 in the first sliding base 401 is allowed to move slidingly on the guide rails 409. In this embodiment, the first and second guide grooves 411 and 421, and guide rails 409 are described in the form of a rod with annular profile, but it will be apparent that they may be configured in any type of polygonal shape.

In the preceding embodiment as earlier described, the first sliding base 301 is configured to slide in the longitudinal direction of the second sliding base 302. During assemble, it may be considerably difficult to assemble coupling components such as the link bar 303 or the rotating pin 335 interposed between the first and second sliding bases 301 and 302. In contradistinction to the preceding embodiment, the first sliding base 401 according to the present embodiment may be coupled in a facing relation with the second sliding base 402, so that after determining the position of the link bar 303 or the rotating pin 335 the first sliding base 401 is arranged at a position corresponding to the determined position, the guide rails 409 may be inserted. Therefore, it will be understood that the spring module 400 according to this embodiment of the present invention utilizes the guide rails 409 for easy assembly.

Figure 14:
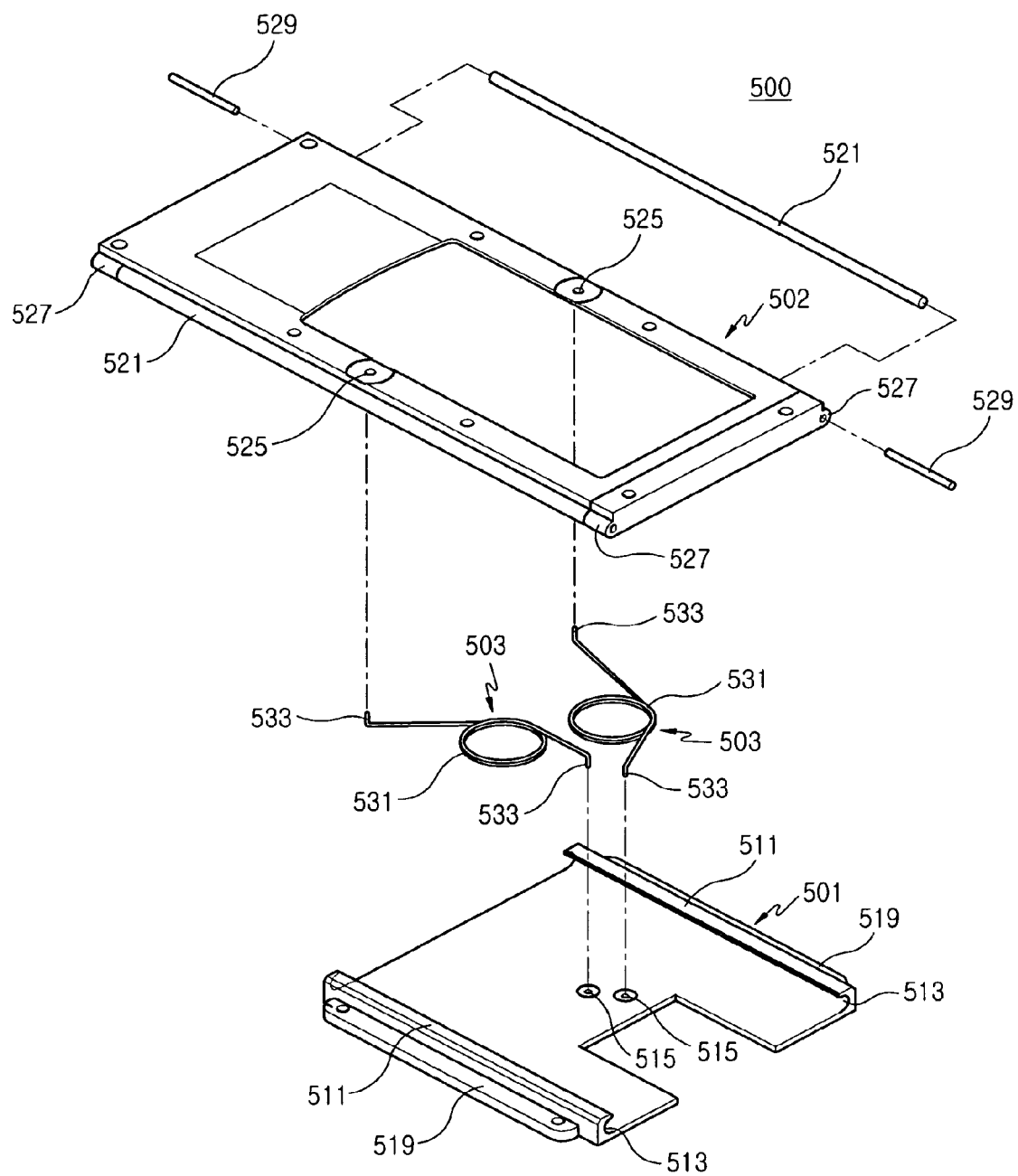
FIG. 14 is an exploded perspective view showing a spring module for a sliding type mobile terminal according to a fourth an embodiment of the present invention.
Figure 15:
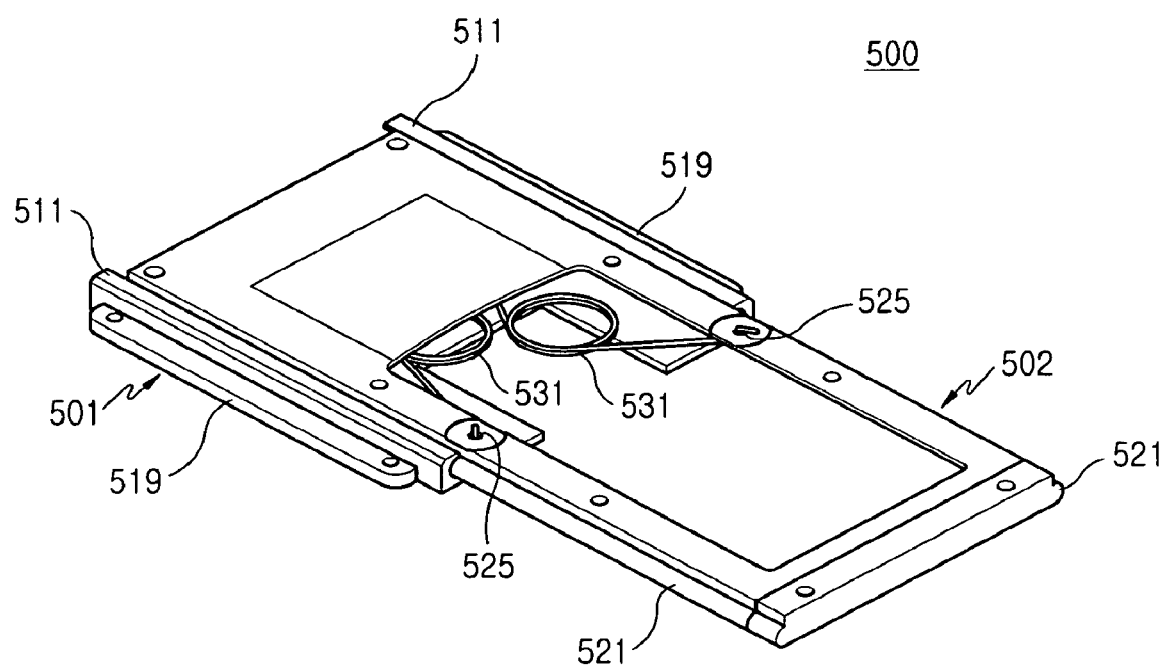
FIG. 15 is a perspective view showing the assembled state of the spring module of the sliding type mobile terminal as shown in FIG. 14.
Figure 16:
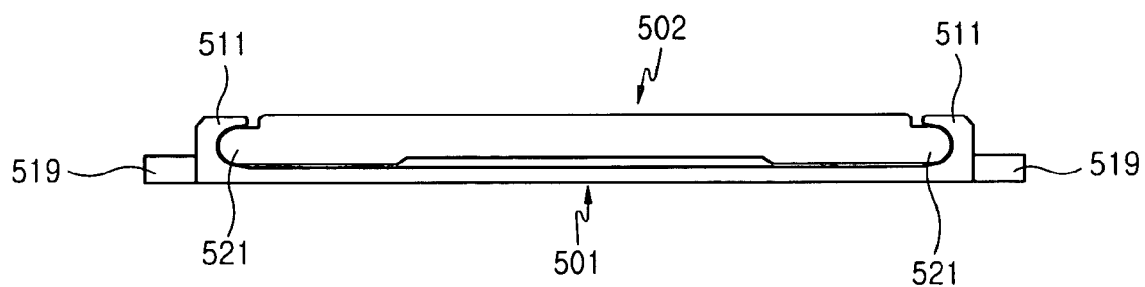
FIG. 16 is a front view of the spring module as shown in FIG. 15.

Referring now to FIGS. 14 to 16, there is shown a spring module 500 of the sliding type mobile terminal according to a fourth embodiment of the present invention. Spring module 500 includes a sliding guide 501, a slider 502 and a pair of torsion springs 503. The sliding guide 501 is configured in the form of a plate with guide ribs 511 arranged in its sides and is provided, on its both side ends, with a coupling rib 519 for coupling with the first housing of the terminal. Each guide rib 511 is arranged adjacent to each coupling rib 519, extending in the longitudinal direction in a face-to-face relation to each other. A guide recess 513 is respectively formed in the inner side of each guide rib 511, extending in the longitudinal direction, for supporting the both side ends of the slider 502. The sliding guide 501 is fixed onto a front surface of the first housing of the sliding type mobile terminal.

On the both side ends of the slider 502 is arranged a guide rod 521 extending in the longitudinal direction, so that the slider 502 is supported by the guide recess 513 and allowed to move slidingly on the sliding guide 501 in the lengthwise direction. The guide rod 521 may be detachably secured to the slider 502 or incorporated into the slider 502. In this embodiment of the invention, preferably, the guide rod 521 is detachably fixed to the slider 502, and support ribs 527 are formed in each end of both sides of the slider 502, respectively, extending along the side of the slider. Once the guide rods 521 are positioned between the support ribs 527, pressing pins 529 are respectively pushed in through the support ribs 527 for fixing to the guide rods 521. The slider 502 is fixed to a backside of the second housing of the sliding type mobile terminal so as to face the sliding guide 501.

As shown in FIG. 16, the guide rods 521 preferably have a round form of cross section, and the guide recess 513 is formed accommodate the shape of the guide rods 521, so that a gap or play between the sliding guide 501 and the slider 502 can be reduced and the slider 502 carries out a sliding operation in a smooth manner. It will be also understood that the cross section of the guide rod 521 may be of any polygon.

The torsion spring 503 includes a coil section 531 for generating an elastic force, and a pair of free ends 533 extending from the coil section 531. The sliding guide 501 and the slider 502 are respectively provided with fixing holes 515 and 525 for coupling the free ends 533 of the torsion springs 503. When the free ends 533 are respectively coupled to the fixing holes 515 and 525 of the sliding guide 501 and the slider 502, the torsion spring 503 is then interposed between the sliding guide 501 and the slider 502. Although a pair of torsion springs 503 is shown by way of example in this particular embodiment, it would be appreciated by those skilled in the art that one or more torsion springs 503 may be used as an alternative embodiment.

Figure 17:
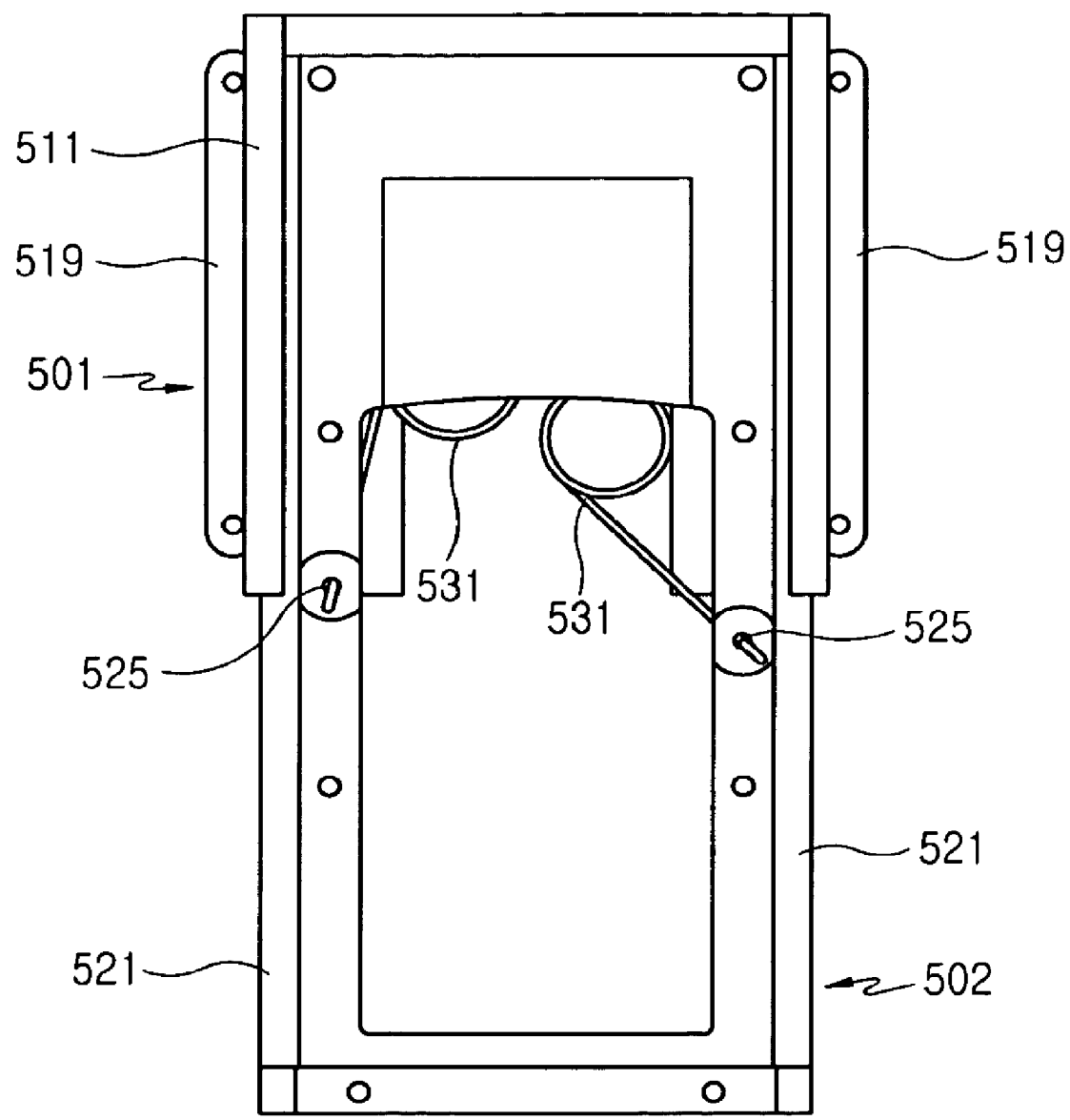
FIGS. 17 and 18 are top plan views illustrating the operation of the spring module of the sliding type mobile terminal as shown in FIG. 15.
Figure 18:
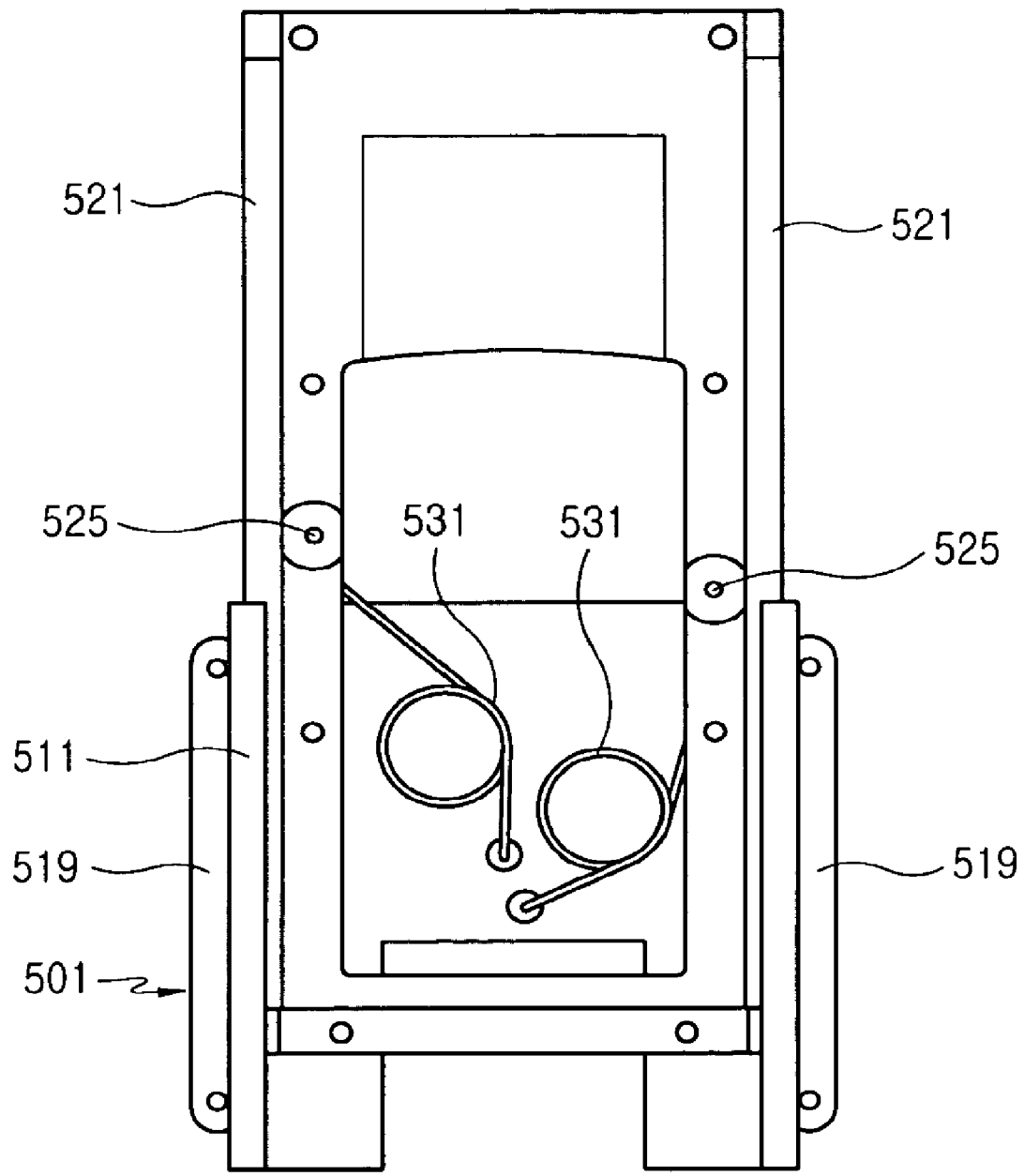

Referring now to FIGS. 15, 17 and 18, the slider 502 is located at one end of the sliding guide 501 by means of the elastic force from the torsion spring 503, in the assembled state of the spring module 500, as initially shown in FIGS. 15 and 17. Once the slider 502 has begun to move on the sliding guide 501, the free ends 533 of the torsion spring 503 come close to each other to accumulate the elasticforce. As such, as the slider 502 is substantially located in the middle of such a movement range, the free ends 533 approach each other in the closest position to render the elasticity stored in the torsion spring 503 at the maximum. At this time of operation, it is noted that the maximum position of the elastic force stored in the torsion spring 503 depends upon positions of the fixing holes 515 and 525 to which the free ends 533 are fixed. Once the slider 502 has passed beyond the maximum position of the elastic force from the torsion spring 503, the slider 502 is allowed to move to the other end of the sliding guide 501 on its own due to the elastic force acting for the distal free ends of the torsion spring 503.

Referring again to FIGS. 6 to 8, and applying the embodiment of FIGS. 14-18 to the terminal shown in FIGS. 6-8, FIG. 6 illustrates the mobile terminal 100 with its first housing 101 fully closed with respect to the second housing 102, wherein the slider 502 is adapted to underlie the sliding guide 501. As the user forces the second housing 102 to move upwardly toward the upper end of the first housing 101 from the closed position (FIG. 7), the elastic force stored in the torsion spring 503 gradually increases.

As the user continues to force the second housing 101 to move further upwardly, the elastic force by the torsion spring 503 effects opening of the first housing 101 by the second housing 102 while passing the nearest approaching position of the free ends 533. As such, the second housing 102 is allowed to move further upwardly toward the upper end of the first housing 101, as shown in FIG. 8, even when the user ceases applying force to the second housing 102. The closing operations in the first housing 101 are to be carried out in the reverse sequence to the opening operations.

Figure 19:
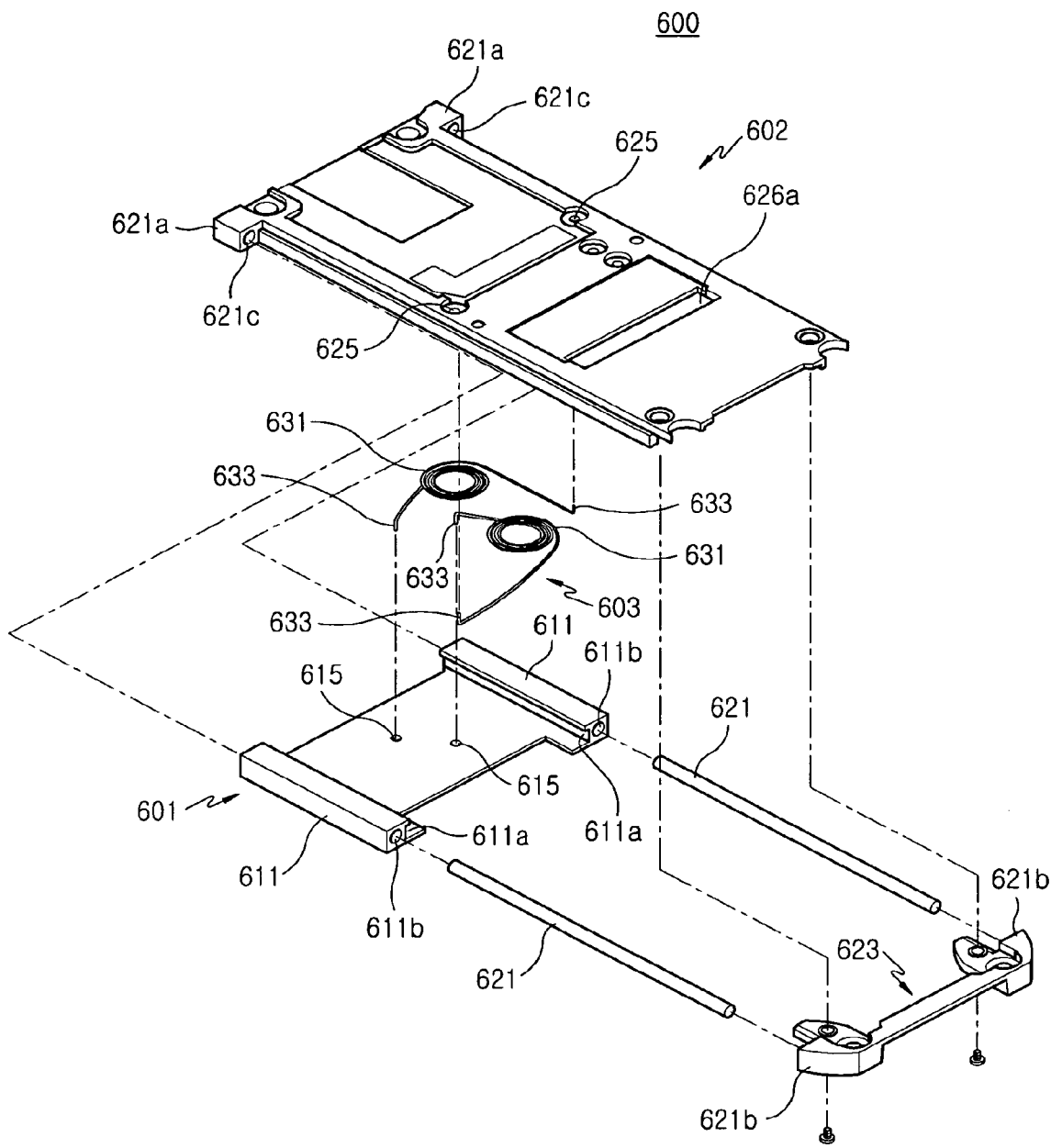
FIG. 19 is an exploded perspective view showing a spring module for a sliding type mobile terminal according to a fifth embodiment of the present invention.
Figure 20:
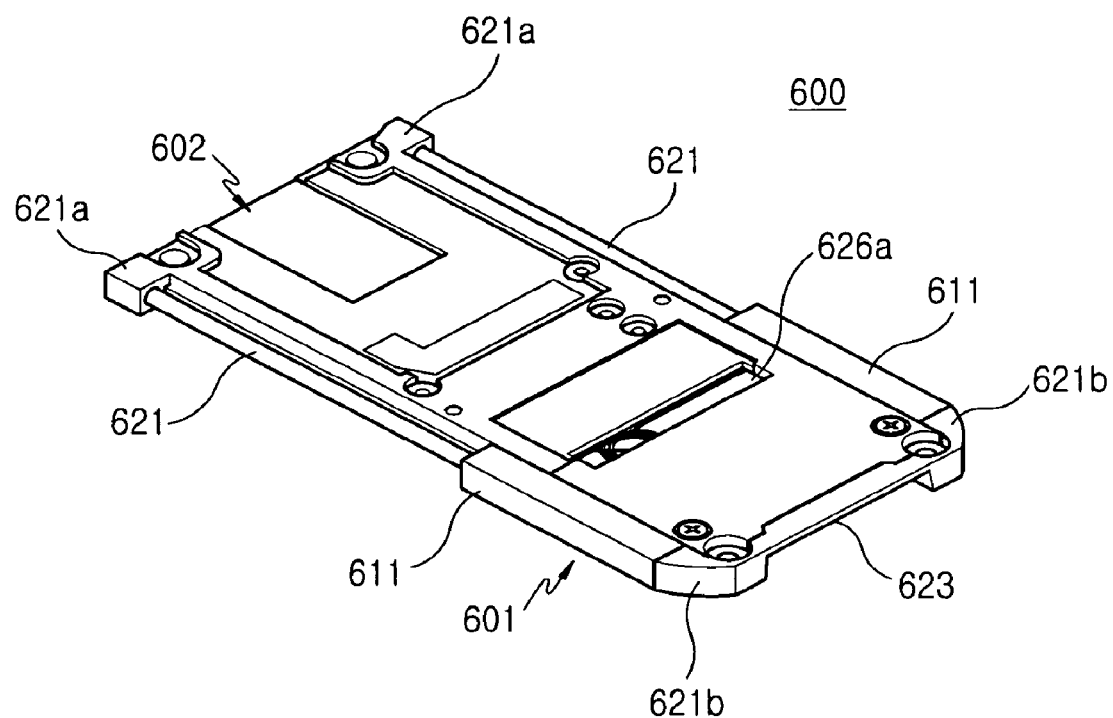
FIG. 20 is a perspective view showing the assembled state of the spring module of the sliding type mobile terminal as shown in FIG. 19.
Figure 21:
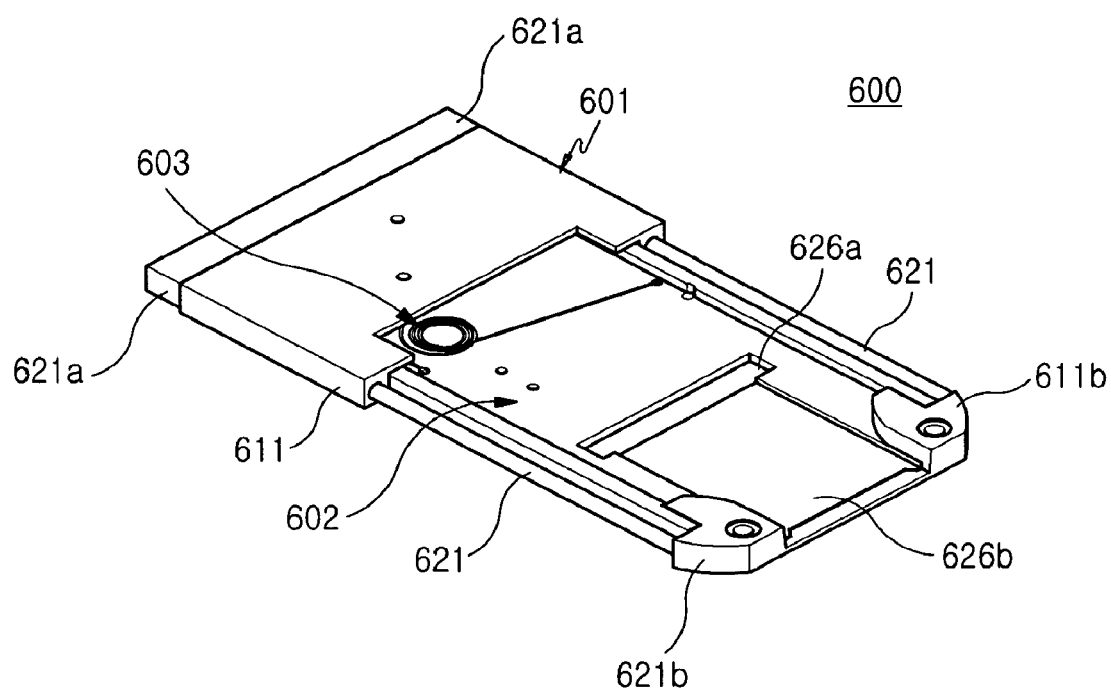
FIG. 21 is a bottom perspective view of the spring module for the sliding type mobile terminal as shown in FIG. 19.

Referring now to FIGS. 19 to 21, there is shown a spring module 600 of the sliding type mobile terminal according to a fifth embodiment of the present invention. As seen in FIGS. 19 to 21, the spring module 600 of the sliding type mobile terminal includes a sliding guide 601, a slider 602 and torsion springs 603. Each side end of the sliding guide 601 is provided with a guide rib 611, respectively. These two guide ribs 611 are positioned to face each other on both side ends of the sliding guide 601, extending in its longitudinal direction along the side end. The inner side of the respective guide ribs 611 is respectively provided with a guide recess 611a extending in the longitudinal direction, for supporting both side ends of the slider 601, and a guide hole 611b is respectively formed into the guide rib 611, in the lengthwise direction. The sliding guide 601 is installed in the front side of the mobile terminal.

Both side ends of the slider 602 each are slidably supported within the guide recesses 611a of the sliding guide 601. The slider 602 is provided with an evasion hole 626a passing through the slider, an evasion recess 626b {FIG. 21) extending from the evasion hole to one end thereof, and a pair of guide rods 621 equipped in the both side ends, in its lengthwise direction, along the guide ribs 611, respectively. These guide rods are respectively fixed to the slider 602 and inserted into the guide holes 611b in the guide ribs 611. As such, the slider 602 is supported by the guide recesses 611a and guide holes 611b of the sliding guide 601 to allow sliding movement in its longitudinal direction.

The slider 602 is provided with support ribs 621a and 621b for coupling of the guide rods 621. These support ribs 621 and 621b consist of a pair of first support ribs 621a each extending in the side direction from one edge of the slider 602 and a pair of second ribs 621b formed on a fixing element 623 coupled with the other end of the slider 602. The fixing element 623 is configured so that it is coupled to the other end of the slider 602 by means of screws, and that the second support ribs 621a respectively extend in the side direction of the slider 602. As such, the first and second support ribs are positioned to face each other in one side of the slider. Into the support ribs 621a and 621b are respectively formed a fixing hole 621c for coupling with one end of the guide rod 621. Here, as the guide ribs 611 of the sliding guide 601 are positioned between the first and second support ribs 621a and 621b of the slider 602, the guide ribs 611 and the support ribs 621a and 621b also function as a stopper for limiting the moving range of the slider 602. The inner sides of the support ribs may be respectively provided with any suitable buffering material for reducing noises or impacts to be possibly created upon collision between the guide ribs 611 and the support ribs 621a and 621b.

In the meantime, coupling of the guide rods 621 with the slider 602 may be configured in the same manner as the preceding embodiment, such as by pressing pins. The slider 602 is attached to the backside of the second housing of the sliding-type mobile terminal to face the sliding guide 601.

Figure 22:
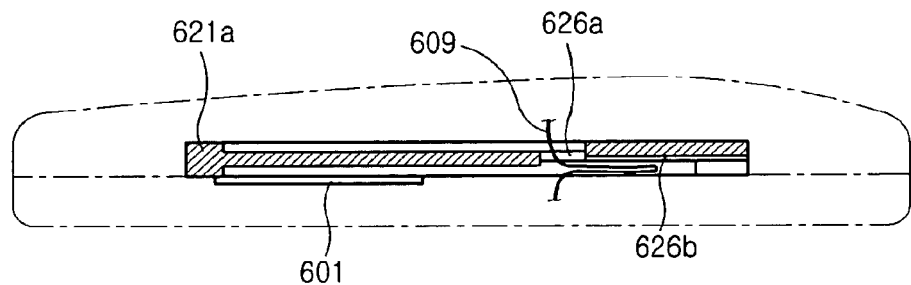
FIGS. 22 and 23 are side sectional views of the spring module for the sliding-type mobile terminal as shown in FIG. 20.
Figure 23:
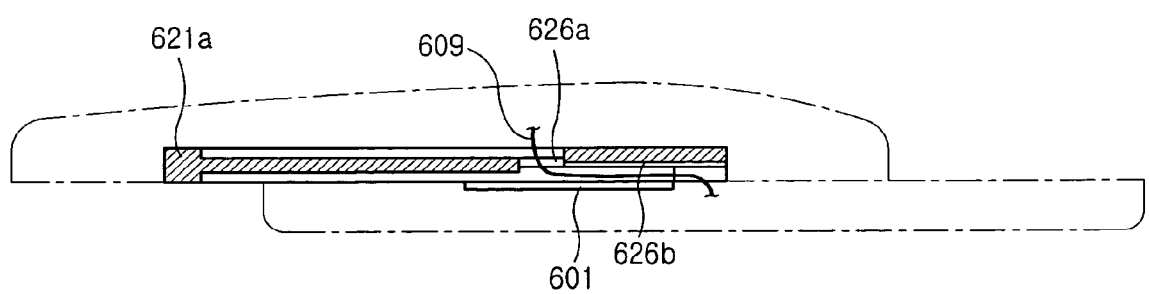

Referring now to FIGS. 22 and 23, once the slider 602 is attached to the second housing of the mobile terminal, a flexible printed circuit board 609 drawn out from the second housing extends through evasion hole 626a and evasion recess 626b to the first housing. Preferably, the evasion hole 626a and the evasion recess 626b have enough width and depth to protect the flexible printed circuit board 609 from interfering with other components, fully taking into account the width and depth of the flexible printed circuit board 609 itself.

The torsion spring 603 is provided with a coil section 631 and a pair of free ends 633 each extending from the coil section 631, the coil section 631 providing elastic force. The sliding guide 601 and the slider 602 are respectively provided with fixing holes 615 and 625 for coupling the free ends 633 of the torsion springs 603. When the free ends 633 are respectively coupled to the fixing holes 615 and 625 of the sliding guide 601 and the slider 602, the torsion springs 603 are then interposed between the sliding guide 601 and the slider 602.

Although only one pair of the torsion springs 603 was shown by way of example in this particular embodiment, it would be appreciated by those skilled in the art that one or more pair of torsion springs may be used as an alternative embodiment of the invention. Further, although in this specific embodiment the torsion spring 603 is used to form an elastic means between the sliding guide 601 and the slider 602, it would be also appreciated by those skilled in the art that other elastic means may be configured with those links and coil springs as disclosed with reference to the preceding embodiments, for implementation of the same purpose and effects of the invention.

Thus, it will be understood from the foregoing description that the sliding-type mobile terminal having the spring modules according to the present invention would be considerably convenient to its user, because it enables a semi-automatic operation so that once the user forces the second housing to move upwardly or downwardly only by a predetermined short distance, then the first housing is smoothly opened or closed with the aid of the elastic force from the elastic means.

As seen from the foregoing description, the sliding-type mobile terminal according to the present invention uses coil springs and a slider on the link bar, as a means for sliding the second housing, so that the sliding open/close operations of the second housing can be carried out in a semi-automatic manner for the user=s convenience. Moreover, in the present invention, guide rails or guide rods are used for coupling a pair of sliding bases or a sliding guide and a slider in a slidable manner, thereby allowing reduction of the play gaps between the various mechanical parts of the mobile terminal, which results in more stable operation of the sliding open/close operations of the second housing. Such reduction in the play gaps between those mechanical parts and more stable sliding operation may be implemented more effectively using a round cross-section of guide rods.

While the present invention has been shown and described with reference to preferred embodiments thereof, it will be understood by those skilled in the art that various changes and modifications in form and details may be made therein and equivalents may be substituted for elements thereof, without departing from the spirit and scope of the invention as defined by the appended claims.

What is claimed is:

1. A sliding type mobile communication terminal having a first housing, a second housing and a spring module, the first housing to be opened or closed with respect to the second housing by means of a sliding movement of the first housing in a longitudinal direction, the spring module comprising:
   a sliding guide fixedly coupled to one side surface of the first housing;
   a slider fixedly coupled to one side surface of the second housing to allow the sliding movement on the sliding guide;
   at least one pair of guide rods being extended in the longitudinal direction and fixed to each end of both sides of the slider, the sliding guide sliding on the guide rods in the longitudinal direction; and
   an elastic means interposed between said sliding guide and said slider for providing an elastic force, said elastic means configured to provide a sliding force, along the longitudinal direction of the first housing, in a first direction to allow closing of the first housing with respect to the second housing within a predetermined range of distance, and to provide the sliding force in a second direction to allow opening of the first housing with respect to the second housing beyond the predetermined range of distance.

2. The sliding type mobile communication terminal according to claim 1, wherein a cross section of said guide rod is circular.

3. The sliding type mobile communication terminal according to claim 1, wherein said guide rods are provided at both sides of said slider, and are integrally formed with said slider.

4. The sliding type mobile communication terminal according to claim 1, wherein said sliding guide comprises a pair of guide ribs arranged to face each other at a certain distance, in both side ends of the sliding guide, and a pair of guide recesses respectively formed in each inner side of the guide rib, extending in the longitudinal direction, said guide rods being slidably supported by said guide recesses.

5. The sliding type mobile communication terminal according to claim 1, wherein said slider comprises a fixing means provided thereon with first and second support ribs, said first support ribs extending in the side lateral direction from one end of the slider, said second support ribs being fixed to the other ends of the slider and extending in the side lateral direction to face the first support ribs, and both ends of the guide rods are respectively fixed to and supported by the first and second support ribs, said guide rods being positioned spaced apart from both sides of the slider.

6. The sliding type mobile communication terminal according to claim 5, wherein said fixing means is configured to be incorporated into one end of the slider.

7. The sliding type mobile communication terminal according to claim 5, wherein said sliding guide further comprises a pair of guide ribs each arranged in both side ends of the sliding guide to face each other, and a pair of guide holes formed to pass through the respective guide rib in the longitudinal direction, said guide rods each being slidably inserted into said guide holes.

8. The sliding type mobile communication terminal according to claim 7, wherein said sliding guide is further provided in the inner side of the guide ribs with guide recesses extending in the longitudinal direction, so as to enclose both side ends of the slider, respectively.

9. The sliding type mobile communication terminal according to claim 1, wherein said slider further comprises an evasion hole formed to pass through the slider, and an evasion recess formed in a surface facing the sliding guide and extending from the evasion hole to one end of the slider.

* * * * *